(12) United States Patent  
Buening

(10) Patent No.: US 8,525,808 B1  
(45) Date of Patent: Sep. 3, 2013

(54) METHOD AND SYSTEM TO LAUNCH AND MANAGE AN APPLICATION ON A COMPUTER SYSTEM HAVING A TOUCH PANEL INPUT DEVICE

(71) Applicant: Alexander Buening, Wroclaw (PL)

(72) Inventor: Alexander Buening, Wroclaw (PL)

( * ) Notice: Subject to any disclaimer, the term of this patent is extended or adjusted under 35 U.S.C. 154(b) by 0 days.

(21) Appl. No.: 13/890,245

(22) Filed: May 9, 2013

Related U.S. Application Data

(63) Continuation of application No. PCT/US2012/043414, filed on Jun. 20, 2012.

(60) Provisional application No. 61/499,122, filed on Jun. 20, 2011.

(51) Int. Cl.
*G06F 3/041* (2006.01)
*G06F 3/048* (2013.01)

(52) U.S. Cl.
USPC ............ 345/173; 715/783; 715/792; 345/156

(58) Field of Classification Search
USPC ... 345/173–178, 104, 156; 178/18.01–18.09, 178/18.11; 715/700, 764–767, 781, 783, 715/788, 789, 792
See application file for complete search history.

(56) References Cited

U.S. PATENT DOCUMENTS

| | | | | |
|---|---|---|---|---|
| 7,595,810 | B2 * | 9/2009 | Louch | 345/629 |
| 8,040,360 | B2 * | 10/2011 | Louch | 345/629 |
| 2005/0149879 | A1 * | 7/2005 | Jobs et al. | 715/796 |
| 2009/0249235 | A1 | 10/2009 | Kim et al. | |
| 2010/0066698 | A1 | 3/2010 | Seo | |
| 2010/0248788 | A1 | 9/2010 | Yook et al. | |
| 2012/0176322 | A1 | 7/2012 | Karmi et al. | |

FOREIGN PATENT DOCUMENTS

| | | |
|---|---|---|
| KR | 20110050248 A | 5/2011 |
| KR | 20110085233 A | 7/2011 |
| KR | 20110093541 A | 8/2011 |
| KR | 20120010056 A | 2/2012 |

OTHER PUBLICATIONS

International Search Report and Written Opinion of the International Search Authority for PCT/US12/43414.

* cited by examiner

*Primary Examiner* — Stephen Sherman

(74) *Attorney, Agent, or Firm* — Michael D. Eisenberg

(57) ABSTRACT

The invention provides a method and system to launch and manage an application which operates on a touch screen or touch panel device, replacing traditionally used HIDs such as a mouse, mouse stick, trackball or touch pad. Variants of the system comprise a viewable screen area splitting module for indicating which target areas of the viewable screen will be used for launch and display of a new application, by an application launch module deciding which applications to launch and display in the previously selected target areas and by an application management module defining in which display mode and state of an already running application will be displayed or otherwise closed. A list of icons displays within the new target area designated for launch of the application. Selection of an icon within the target area, informs the system which application to display in the target area.

16 Claims, 16 Drawing Sheets

METHOD AND SYSTEM TO LAUNCH AND MANAGE AN APPLICATION ON A COMPUTER SYSTEM HAVING A TOUCH PANEL INPUT DEVICE

CROSS-REFERENCES TO RELATED APPLICATIONS

The present application is a continuation of PCT Application Serial Number PCT/US12/43414 filed Jun. 20, 2012 which claims priority from U.S. Provisional Application Ser. No. 61/499,122 filed on Jun. 20, 2011, which are each hereby incorporated herein by reference in their respective entirety.

TECHNICAL FIELD

The present invention relates to information technology (IT) and more particularly to a method and system to launch and manage applications operating computer systems of the type having a touch panel display (touch screen) as the primary input device and having a graphical user interface (GUI) for launching, managing and working with applications and the operating system.

BACKGROUND OF THE INVENTION

For those skilled in the art of the present invention, it is of common knowledge that there exists a multitude of different operating systems from different vendors, yet the process of launching and managing an application on traditional computer systems having a screen, a mouse family type input device and a graphical UI is, in terms of process, identical. For example: a) the user selects the application to launch using a program manager that lists all available applications, for example, in tree view style or using a home screen or a desktop on which the various applications are represented with small pictures also known as icons. b) The user decides whether to display the started application on the entire viewable area (maximized or full screen) or only in a dedicated smaller area of the entire viewable screen area. In this case the user can also move the application's window (the viewable user interface portion of the application) on the screen to any desired position. c) If several applications have been launched the user can switch between the applications using a task manager if all applications have been maximized or he can simply use the mouse family type input device to point to a window of the desired application if these applications reside next to each other on the entire viewable screen.

It is important to notice that this method is appropriate for a computer system which is equipped with a human input device (HID) such as mouse, mouse stick, touch pad or track ball which allows to execute a complex suite of actions with high precision—requiring fine motor skills—on very small areas of the viewable screen. With the HID, the user moves a viewable pointer on the screen (mouse pointer) and this movement occurs with high precision thanks to fine motor skills of the user and the fact that the HID device translates larger movements of the HID to smaller movements of the pointer, thus achieving even greater precision. Furthermore HIDs do not only provide precise movement translation, but also further input controls such as additional buttons or wheels to operate important UI functions independent or in conjunction with the movement detection.

For a better understanding of the legacy process, FIG. 1 shows the different steps as they are used on traditional computer systems having a screen, a graphical UI and a mouse family type of input device.

For those skilled in the art it is common knowledge that it has become an important global industry trend that classical computer systems having a screen and using a HID such as mouse, touch pad or track ball are growingly replaced by devices using a touch panel and the human finger(s) as the primary input device. Those devices—typically referred to as tablet PCs ('tablets') and SmartPhones—are generally characterized by the fact that the viewable screen is technically combined with a second layer—a touch panel—to control operations on the device with the human finger(s). Viewable and touchable area is generally the same. The touch panel replaces both the classical external keyboard by displaying a virtual keyboard on the screen and the classical mouse family type of input device by interpreting the user's finger touches on the touchable screen as events for controlling operations of the operating system or applications.

The fact that touch panel devices combine the functions of several traditional external input and output devices (for example: screen, mouse, keyboard) leads to reduced costs and also to higher reliability of this new device type because moving parts as required for keyboard and mouse are no longer used. This however translates to reduced manufacturing and total ownership costs throughout the life cycle of the touch panel device. This amongst other advantages—plus the fact that touch panel devices are often perceived less as a computer but more as a consumer device—explains the strongly growing popularity of this device type, which is important to notice for the relevance of this invention.

It is important to notice that the effectively interpretable input resolution of the touch panel is naturally much lower than the input resolution of a classical computer system having a HID such as mouse, touch pad or trackball because the surface of the human fingerprint is many multiples larger than the exactly positioned point or area of a graphical pointer as used by HIDs. Also—as there is no HID—there is no translation of 3 bigger HID movements to smaller movements of a (non-existing) graphical pointer. Instead finger touches of the user are translated 1:1 to X/Y coordinates on the touch panel. Furthermore HIDs provide further input possibilities as described above that can simply not be copied or emulated with the human finger for obvious reasons. As a consequence, using the finger as input device is much more imprecise and cannot provide the same feature set as using a dedicated HID.

Due to the limitations of the human fingers as an input device, the classical launch and window management of applications on computer system having a HID such as mouse, mouse stick, touch pad or track ball cannot be applied to computer systems having a touch panel as the primary input device. It is simply not practical, it is considered extremely difficult or impossible to imitate complex HID operations that require fine motor skills with something as big and imprecise as the human finger. The usage problem exists not only on small devices with small view area and touch panel such as SmartPhones but also on mid-sized devices such as tablet PCs that provide a viewable and touchable screen area of 10" and more nowadays.

As a consequence of the limitations of the human finger as an input device and because of other system limitation, the majority of operating systems for such SmartPhones or tablets were conceived to simplify the application launch and management by providing a very basic method. To better understand the differences to the traditional approach to manage user input FIG. 2 shows the traditional process.

The disadvantages of the method described in FIG. 2 are obvious: a) only one application can be monitored and worked with at a time. Applications that have been launched before the last selected application may run in the background but the user has no visual feedback of the state of such an application. Maybe the application has finished a process and important results for the user exist, maybe the application was terminated by the operating system for some reason—the user will not know it. b) in order to launch a different application the currently running application must be closed or reduced in viewable size. Often this means that the user must switch to the desktop and select and launch a new application from there, c) the exchange of information (for example copy and paste of text) between different application is greatly complicated because the application providing the source information must be closed or set to background, then the application receiving the information must be launched or put to foreground. A simple transfer from one UI window to the other is not possible.

In essence: 1. It is an industry trend that traditional computer systems of the type having a screen, a graphical UI and a HID (human input device) such as mouse, mouse stick, trackball or touch pad are increasingly being replaced by computer systems having a screen, a graphical UI and a touch panel that is integrated into the screen display and that is operated with human finger as primary input device. These devices are generally referred to as SmartPhones or tablet PCs. 2. The traditional method of application launch and window management for computer systems with graphical UI and having a HID such as mouse, mouse stick, track ball or 4 touch pad as an input device cannot be applied to the new generation of touch panel devices such as SmartPhones and tablets due to the natural limitations of the human finger as input device: the method is difficult to use, inefficient and de-facto not practicable. Those skilled in the art know that operating systems trying to implement this method nevertheless (using the finger or a finger replacement such as a stylus) have failed to impose itself in the market. 3. The current, commonly implemented and used method to launch and manage applications on the new generation of touch panel devices as shown in FIG. 2 is significantly limited, in particular because different applications can not truly be run in parallel, cannot be monitored by the user next to each other at the same time, because exchange of information is cumbersome. At the time of writing this patent document about 90% of all SmartPhones and tablet PCs use the method as described in FIG. 2 according to data provided by well-established market research companies.

BRIEF SUMMARY OF EMBODIMENTS OF THE INVENTION (1) The present invention relates to a computer implemented application management system for devices having a touch screen display. The devices may comprise a processor and a non transitory computer readable medium. In a variant, the system comprises: a splitting module configured to assign an area of the display for use with an application in response to an action of a user of the device; an application launch module configured for determining a new application to be launched and displayed within the assigned area of the display and then launching the new application, in response to an action of the user of the device; and an application management module configured to adjust the display status of a launched application in response to an action of the user. The launched application operates as any application would according to its configuration and is fully capable of being interacted with by the user within its assigned area.

(2) In another variant of the system, the splitting module comprises a plurality of predefined screen split configurations and the system is configured to display a listing of representative icons corresponding to the predefined screen configurations to the user. The splitting module is configured to assign an area of the display for use with an application in accordance with the configuration represented by the icon selected by the user.

(3) In a further variant of the system, the splitting module comprises a plurality of predefined screen split configurations assigned to one or more gestures on the touch screen. The splitting module is configured to assign an area of the display for use with an application in response to the corresponding gesture carried out by the user.

(4) In yet another variant of the system, the splitting module is configured assign a variable size area of the display for use with an application to be launched based on a gesture carried out by the user. The variable size area lies on a continuum sizes selectable by the user.

(5) In still a further variant of the system, if no applications are operating that have been launched by the user, the splitting module is configured to assign a portion of screen or the entire available screen as unused screen within which an application may be launched.

(6) In a variant of the system, if at least one application is operating and utilizing the entire available screen area, the splitting module is configured to reduce the occupied screen space used by the at least one application and generate new unused screen space for use with an application to which may be launched by a user.

(7) In another variant of the system, if at least one application is operating and utilizing a screen area less than the entire screen area, the splitting module is configured to assign two or more unused areas of the display for displaying respective applications to be launched by the user.

(8) In a further variant of the system, if at least one application is operating and utilizing a screen area less than the entire screen area, the splitting module is configured to assign the unused area to display a list of launchable applications by the user.

(9) In yet another variant of the system, if at least one application is operating and is displayed in a screen area previously generated by the splitting module and smaller than the entire physically available screen area, the application management module is configured to toggle between maximizing the displayed area of the application to encompass the entire available screen area and to reduce the size of the maximized displayed area of the application to the previous display size and position of the previously assigned unused screen area.

(10) In still a further variant of the system, prior to a new application being launched, the system is configured to first assign an portion of the display to a yet undetermined application to be launched.

(11) In a variant of the system, prior to the launch of a new application, the system is required to operate the splitting module to assign a new area of the screen, prior to the application launch module.

(12) In another variant of the system, the option to select which subsequent application to launch after a first application has been launched, only appears within newly assigned areas of the screen, assigned by the splitting module.

(13) In a further variant of the system, the application management module is configured to close a previously launched application in response to an action of the user.

(14) In still another variant of the system, if an application displayed within an assigned area has been closed by the application management module, the system is configured to display a list of icons representing launchable applications within the assigned area.

(15) In yet a further variant of the system, the system is configured to display two or more applications simultaneously on the touch screen display within respective assigned areas of the screen. When an application displayed within an assigned area has been closed by the application management module, the system is configured to display a list of icons representing launchable applications within the assigned area which had previously displayed the closed application.

(16) In a variant, a computer implemented method for application management on devices having a touch screen display, wherein the devices comprise at least a processor and a non transitory computer readable medium, comprises: assigning a first area of the display for use with an application in response to an action of a user of the device; determining a new application to be launched and displayed within the assigned first area of the display and then launching the new application, in response to an action of the user of the device; and adjusting the display status of a launched application in response to an action of the user.

(17) In another variant of the method, the step of assigning a first area of the display for use with an application occurs before determining the application to be launched within the assigned first area.

(18) In a further variant, the method comprises displaying a list of icons representing launchable applications within the assigned first area.

(19) In yet another variant, the method further comprises: assigning a second area of the display for use with an application in response to an action of a user of the device; reducing the size of the assigned first area of the screen for an application running at the time of the action of the user is carried out; displaying a list of icons representing launchable applications within the second assigned area; launching an application selected from the list of icons and displaying the launched application within the second area; and displaying the applications simultaneously on the touch screen display within respective assigned first and second areas of the screen in response to the action of the user.

(20) In still a further variant, the method comprises: closing an application displayed within an assigned area; and displaying a complete list of icons representing launchable applications within the assigned area which previously displayed the closed application.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

Figure 1:
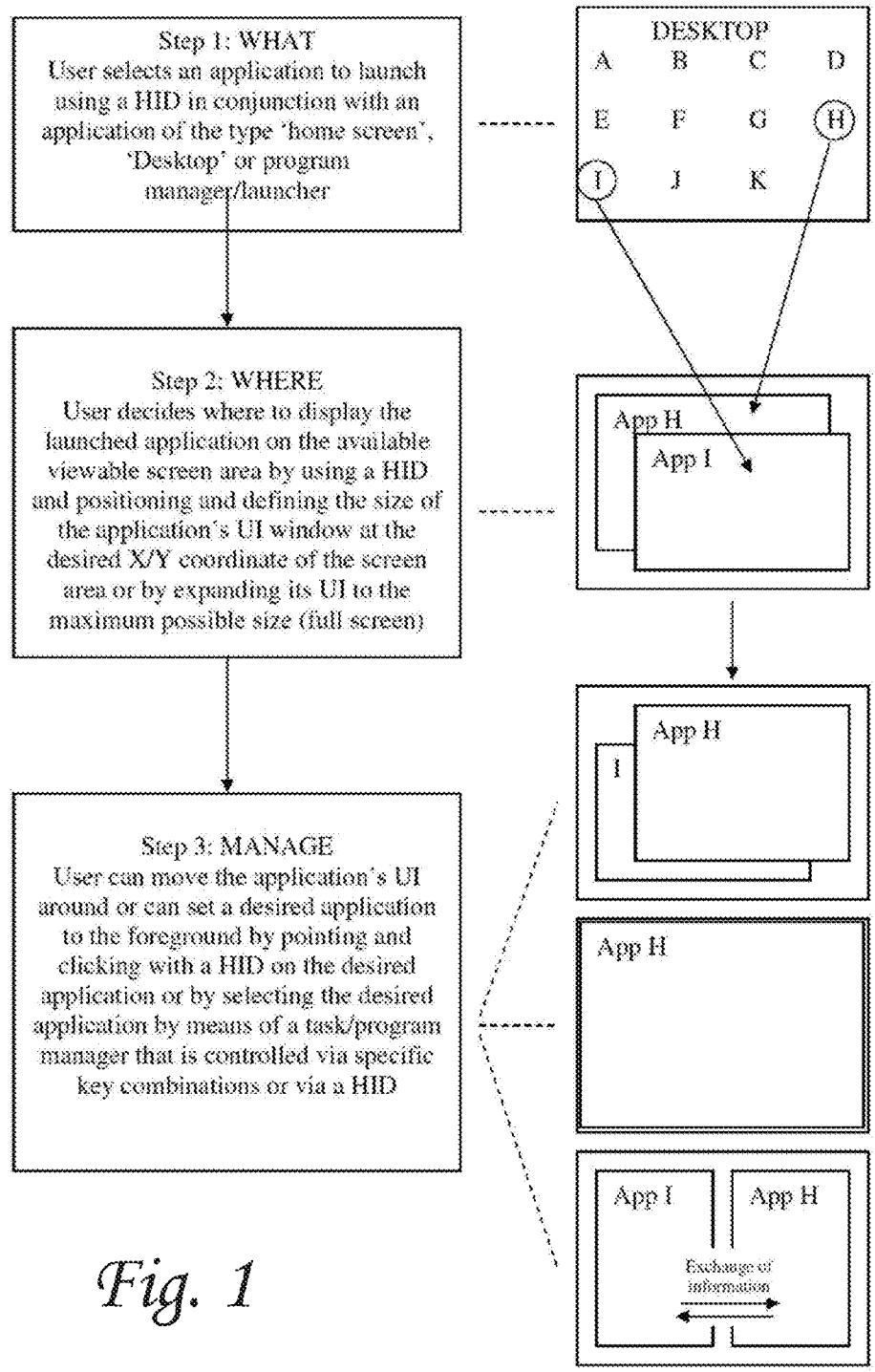
FIG. 1 is a flow chart showing the process and the typical user experience of launching and managing an application on a traditional computer system with graphical UI and use of HIDs such as mouse, mouse stick, touch pad or track ball.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

Overview

The present invention provides an application launch and management system and method which is compatible with the new generation of touch panel display devices such as SmartPhones and tablet PCs and which allows the user: a) to define quickly and efficiently in what area of the screen which application should be executed and displayed; b) to use different applications truly in parallel without the limitations with legacy systems as described above; and c) to allow exchanging data more efficiently between running applications without the limitations of legacy systems as described above by providing instant access to the running applications.

The application launch and management method and system of the present invention is designed for use in conjunction with a computer platform of the type having a touch panel as the primary input device and a graphical user interface (UI) for launching, managing and working with applications and the operating system, for the purpose of providing the computer platform method and system to launch and manage applications more efficiently.

In a variant, the method and system to launch and manage an application according to the invention comprises: (1) in the event that no application is already running, a method to assign a portion or the entire available screen as unused screen area for use with an application to launch; (2) in the event that already at least one application is running using the entire available screen area, a method to split the occupied screen space used by that or those application(s) to generate new unused screen space for use with an application to launch; (3) in the event that already at least one application is running using a portion but not the entire available screen area, a method to split the available unused screen area further into smaller portions for use with more than one application to launch; (4) in the event that unused screen area already exists, a method to launch a new application and display its UI in the unused screen area; and (5) in the event that at least one application is running and its UI is displayed in a screen area generated by this invention and smaller than the entire physically available screen area, a method to maximize the UI of this application to use the entire available screen area and a method to reduce the size of the maximized UI back to the size and position of the originally assigned unused screen area generated by the system and method.

In architecture, variants of the method and system to launch and manage an application is based on an object and event orientated component model which comprise: a) a splitting module which is integrated in the operating system or in an application of the type, home screen, desktop, or program manager, which are well known to those skilled in the art, which is capable to respond to specific gesture, or UI control or external events in order to detect whether the user wants to assign an area of the viewable screen for use with an application to launch and, depending on the users input and corresponding algorithms, to determine which exact area of the viewable area should be assigned for launch of a new application; b) an application launch module which is integrated in the operating system or in an application of the type, home screen, desktop, or program manager and which is capable to respond to specific gesture or UI control events in order to decide which new application should be launched in conjunction with the assigned unused screen area; and c) a task/application management module which is integrated in the operating system or in an application of the type, home screen, desktop, or program manager and which is capable to respond to specific gestures or UI control events in order to detect whether the user wants to change the display status of an application, and if YES, to display the application's UI in bigger or maximized form if the UI was formerly displayed in reduced size within the borders of the specifically assigned screen area for this application, or to display the UI of the selected application from its larger or maximized form back to its reduced size form within the borders of the specifically assigned screen area of the application.

The method and system to launch and manage an application is characterized by the provision of a viewable screen area splitting module for indicating which area(s) of the viewable screen will be used for launch and display of a new application, an application launch module deciding which application(s) to launch and an application management module defining in which display mode and size an already running application will be displayed or otherwise closed.

DETAILED DESCRIPTION

Figure 3:
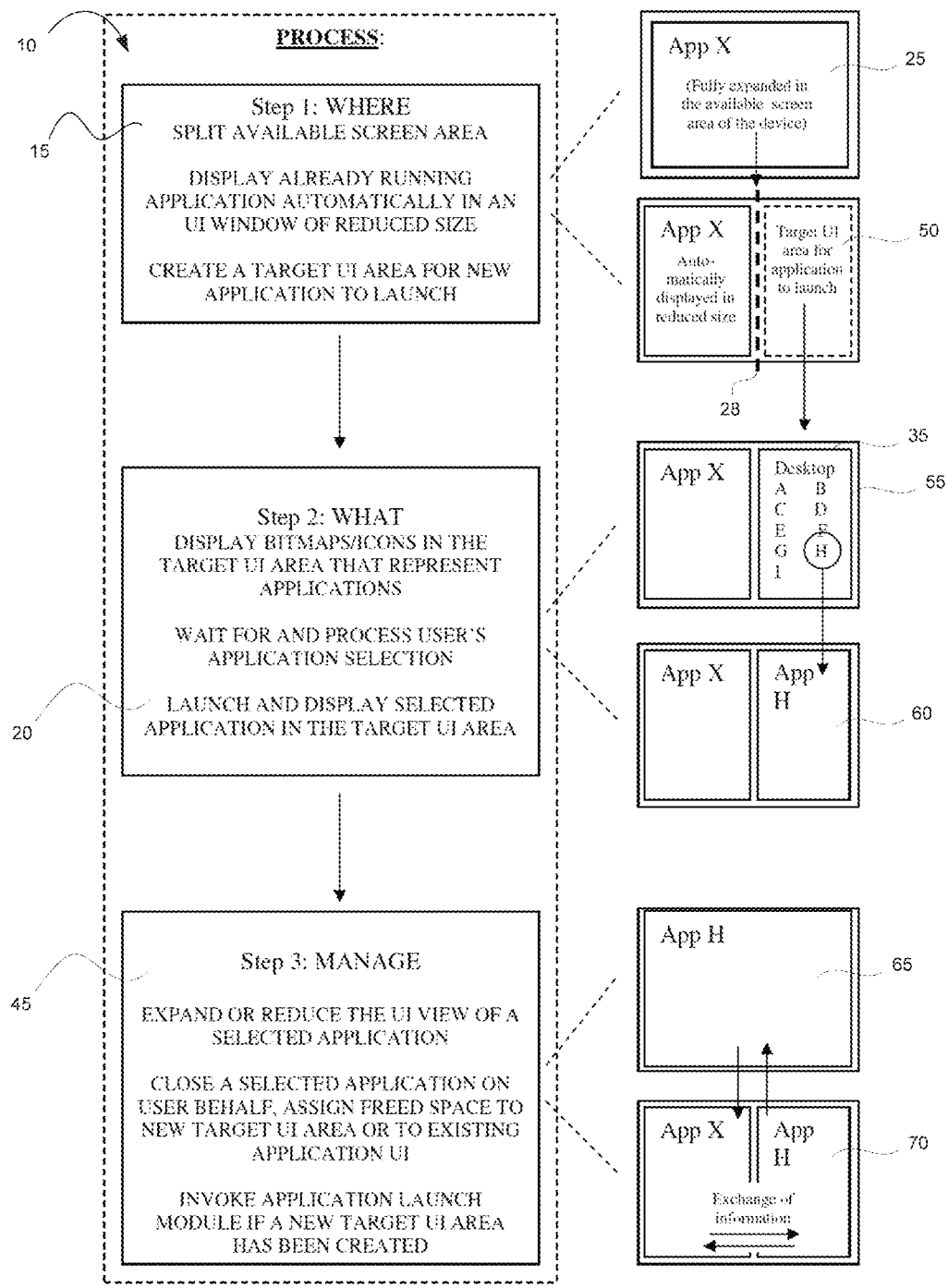
FIG. 3 is a block diagram showing the process and the user experience of launching and managing an application on a computer system having a graphical UI and having a touch panel as primary input device (tablet PC, Smartphone etc.) according to the invention.

Referring to FIG. 3, a new system and method 10 of launching and managing an application on a touch screen display is provided. FIG. 1 illustrates a legacy systems and methods which operate on traditional computer systems of the type having a graphical UI and a dedicated HID such as a mouse, mouse stick, track ball, touch pad or similar. In comparing FIGS. 1 and 3, the process according to the present invention illustrated in FIG. 3 reverses legacy steps 1 and step 2: first, in a step 15, the target screen area for an application to launch is defined using a splitting module 30, then, in a step 20, an application is selected, launched and displayed in the previously assigned target area of the screen. This reversed process is feasible thanks to a few gestures or input touches on the touch panel and therefore far more efficient than trying to apply the original process of the prior art as shown in FIG. 1 which is difficult or impossible to execute on touch panels due to the limitations of the human finger as an input device, due to missing additional input controls as provided by HIDs, due to a lower input resolution overall, limitations as described above.

Figure 2:
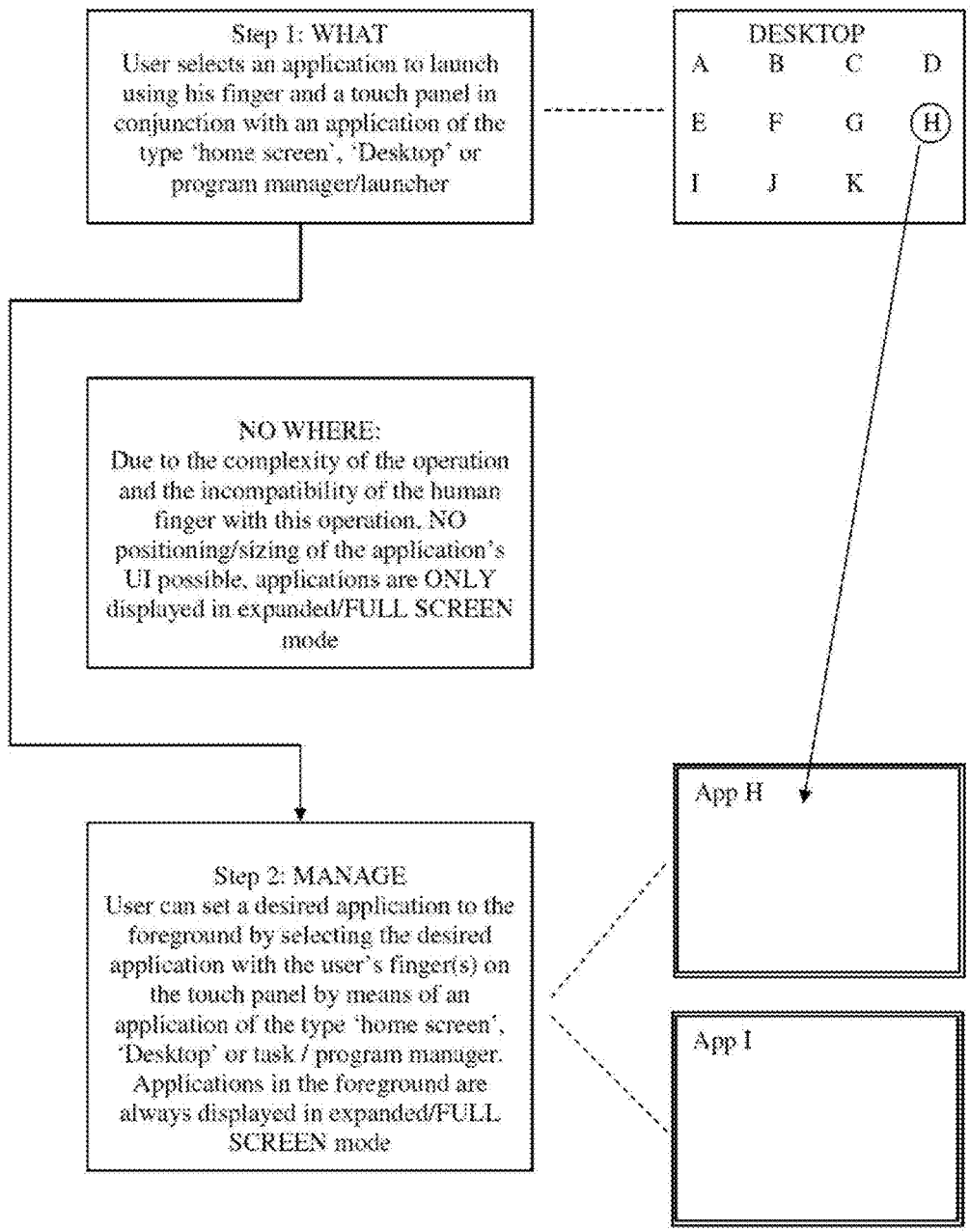
FIG. 2 is flow chart showing a legacy process and the currently prevailing typical user experience of launching and managing an application on a computer system with graphical UI and having a touch panel as primary input device (tablet PC, Smartphone etc.)

FIG. 3 also illustrates additional advantages over legacy methods of launching and managing an application on new generation computer systems of the type having a graphical UI and a touch panel as the primary input device as shown for comparison in FIG. 2. A process according to the prevention invention adds additional steps and features that are not available with the currently used method of the prior art. Application windows of reduced size can be created, application UIs can be displayed with different dimensions in parallel next to each other and exchange of information can be done directly between applications running in parallel on a touch screen device.

FIG. 3 illustrates at the beginning step 25 of the process, an application X is already running and is displayed fully expanded in the available screen area of the device. This is also the typical way to display the UI of an application using the current commonly used method of the prior art to display an application on SmartPhones and tablet PCs. It is important to understand that what is sometimes referred to available screen area is not necessarily identical with the entire physical display area of such a device. In many cases operating systems reserve smaller areas of the screen for displaying information useful for the user, such as time, connection status to networks etc. or reserved areas are used to display touch input controls such as menu buttons of general purpose that can be used in conjunction with all applications depending on whether these applications make use of some or all of these menu buttons.

Furthermore, the viewable screen area can also encompass a virtual screen area that means a screen area bigger than the physical display size of the touch panel device that is expanded by an additional screen area provided by external monitors connected to the touch panel device.

In architecture, the screen area splitting module 30 (A) as shown in FIG. 3 can be part of the operating system or of a dedicated application that is launched before any other application is launched or that is launched after an application has been launched and that runs in the background with, for example, a gesture detection module listening to the users input as described in below.

Optionally, the screen area splitting module 30 provides viewable UI controls that the user can see and touch to start a splitting process. Optionally, the splitting module 30 has a gesture detection algorithm configured to identify and respond to specific gestures on the touch panel that have been defined to start a splitting process.

In this description, and in one example, a gesture is used for initiating the splitting process and the gesture is represented by a dashed line from the top to the bottom of the entire screen area, symbolizing a gesture that comprises a) touching the touch panel in the very top of the screen area, b) moving down the finger to the bottom of the screen area always keeping in touch with the touch panel, and c) releasing the finger at the very bottom of the screen area to complete the gesture. However, gestures can be of different arbitrary types. In this example, a vertical finger movement 28 from the top to the bottom (or vice versa) can indicate that the screen should be split vertically at the indicated position on the X-axis of the display. Completely different gestures are imaginable such as pressing and holding down 2-n fingers on the touch panel, which could mean to divide up automatically the totally available screen space into 2-n target UI areas.

Furthermore, as an example, as mentioned above the splitting process could also be initiated by the user's touch of a UI control that is somewhere displayed on the viewable screen area, that represents splitting in a specific way, for example horizontally, vertically or both simultaneously and that could be, as an example, moved with the user's finger to a specific location on the screen representing the virtual center point of the split UI target areas.

Figure 5:
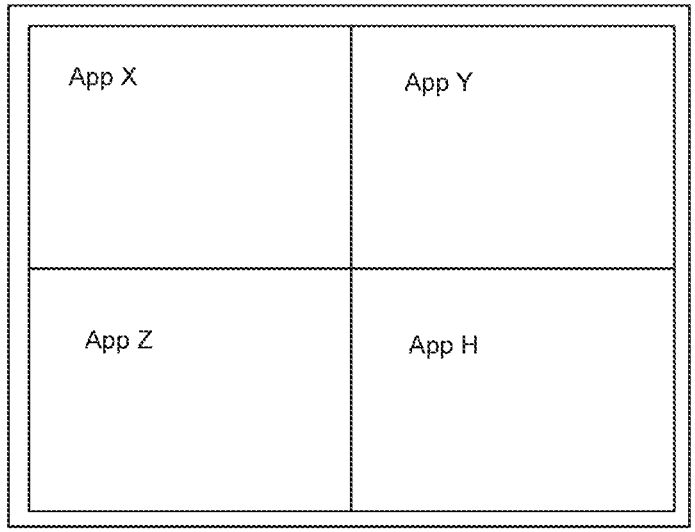
FIG. 5 is a block diagram illustrating a variant displaying four different applications running simultaneously.
Figure 6:
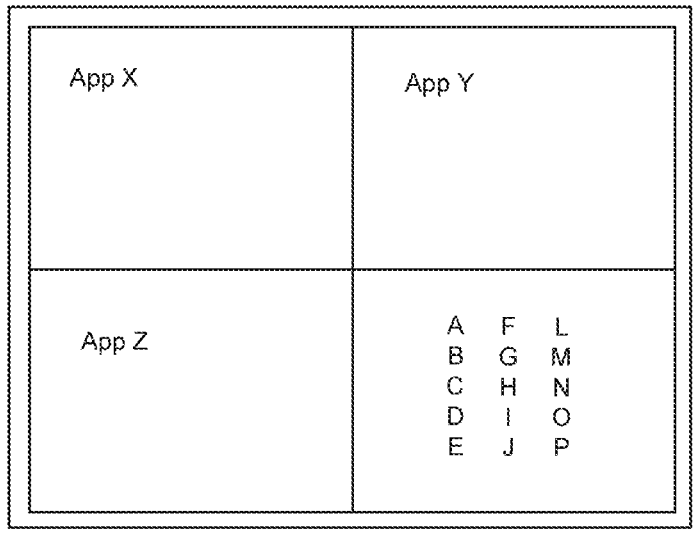
FIG. 6 is a block diagram illustrating one of the four applications closed from FIG. 5.
Figure 7:
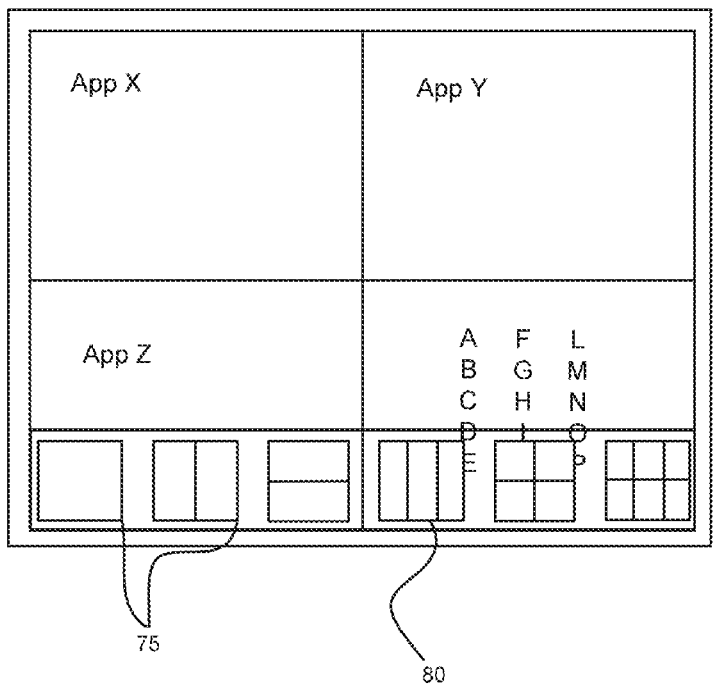
FIG. 7 is a block diagram illustrating a variant with preconfigured screen split configurations displayed to a user for selection.

In a further example, referring to FIG. 7, the splitting process may optionally also be initiated according to a preset configuration 75 of UI areas (and possibly associated applications) that has been created with or without intervention of the user and that the user has selected via some UI control. As an example, a user could create a preset based on a template that represents splitting the entire available screen area according to some logical scheme, such as, for example, creating four zones with identical dimensions for four applications as illustrated in FIGS. 5-7. In this example, process 10 transforms the display from screen 25 to the screen shown in FIGS. 5-7.

Moreover, the event starting the splitting procedure may vary according to the preferences of the user and the physical dimensions of the resulting UI windows are completely variable as well.

Figure 4:
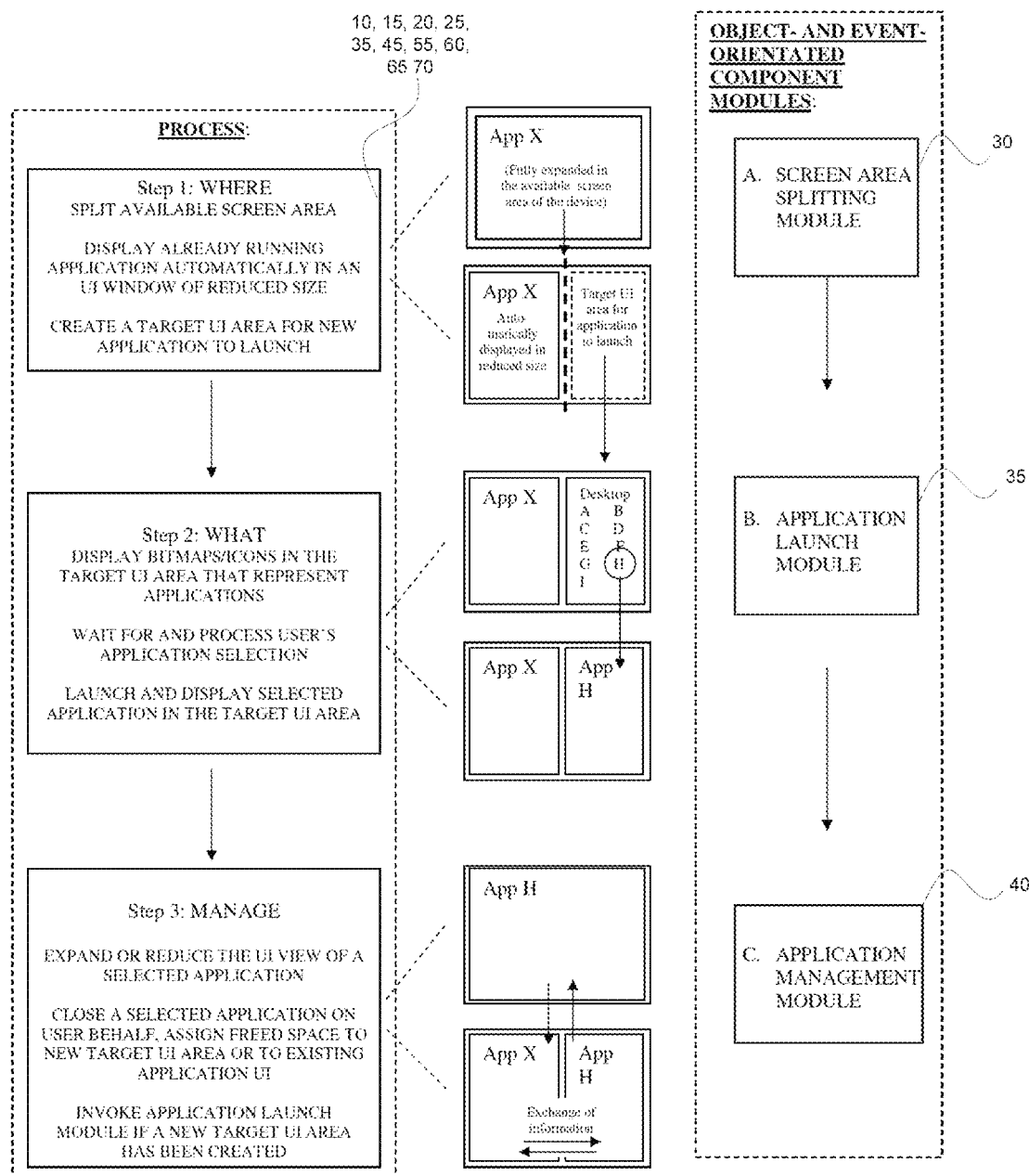
FIG. 4 is a block diagram illustrating the corresponding object- and event-orientated component modules and their relationship to FIG. 3.

Common to all implementations of the screen area splitting module 30 is the automatic process of splitting which comprises a) in the event of an already in the foreground running application to force that application to reduce its UI dimensions to the desired, specified size, b) to invoke the application launch module 35 (B) shown in FIG. 4, and to communicate to this module 35 the positioning and dimensions of the target UI area for a new application to launch.

Splitting can be repeatedly executed in the UI area of an already running application or in a non-assigned target UI area to create space for 1 to n applications.

Optionally, splitting does not have to occur symmetrically as shown in FIG. 3, meaning the previously launched already running application X could be displayed in an area smaller or bigger than 50% of the available screen area and correspondingly the selected target UI area would be smaller or bigger than 50% of the available screen area.

The creation of target UI windows for two or more applications to launch is extremely simplified and accelerated in time in comparison to the traditional method shown in FIG. 1 because with one simple gesture the user can automatically create a multitude of UI target areas that are using the available screen area in an optimal way according to the user's desire. This significant advantage is amplified by the application launch module 35 that instantly provides the user with a choice of applications to launch and display in the created target UI area(s). For example, a copy the desktop appears in each newly created target UI area.

The application launch module 35, as shown in FIGS. 3 and 4 of the preferred embodiment of the invention, has been designed similar to a traditionally used desktop application in which small bitmaps or icons, shown in the target UI area created in step 15 by the splitting module 30, represent applications that can be instantly launched by touching the bitmap/icon on the touch panel with the user's finger. However, applications can be selected in different ways, for example, a) an already running application is simply mirrored to the new screen area (web browser is opened twice to show different contents, a word processing SW is opened twice to work on two different documents in parallel) by means of a simple gesture on the touch panel such as, to give an example, holding down two fingers simultaneously: one finger on the application to mirror, one finger in the target UI area to use. In another example, b) a specific application is simply launched and displayed in the new screen area without any user interaction according to a preset application launch sequence that may or may not have been defined by the user or c) a combination of applications is launched according to a preset as previously described above.

Common to all implementations of the application launch module 35 is a) waiting for and responding to some event triggered, with or without the intervention of the user, that decides which application(s) to launch, b) launching the selected application(s) and displaying the/each application's UI in its dedicated UI target area as specified and assigned by the screen area splitting module 30 and process as described in above.

Although it is not possible to predict exactly the time of execution of the screen area splitting module 30 and the application launch module 35 as the execution time depends on the user's personal capabilities and the technical performance of the computer system in use, it can be said that the present invention provides for several applications that can be launched and precisely positioned within very few seconds which represents a significant speed and comfort advantage in comparison to the methods of prior art. Furthermore for understanding the relevance of this invention it is important to notice that many hundred thousands of small applications, also called apps, as available for SmartPhones execute, and are optimized by nature for use with small screen UIs. The present invention provides the necessary process and environment to be able to display in parallel a multitude of these small UI applications on a bigger screen size, such as currently existing on tablet PCs, leading to a complete new richer user experience on such tablet PC devices.

Once the desired application(s) has/have been launched in the desired screen area, the application(s) can be used by the user for its specific purpose. The application management module 40 as shown in FIG. 4 allows the user to change the state of an already running application that was launched with the application launch module 35. A change of state may involve: a) closing the application and assigning the new available free space either to one or more running applications so that their UI size can be increased or reserving the new available free space and invoking the application launch module 35 with optional use of the screen area splitting module 30 for further splitting of the free available screen area; b) expanding temporarily or permanently the UI size of a running application to a larger or maximum size equal to the entire available screen area; or c) reducing the size of an expanded application UI back to the exact dimensions and positioning of the originally assigned target UI area as represented with the double arrows in step 45 of FIG. 3.

In a variant, the application management module is configured to wait for and respond to: a) events triggered by the user, for example execution of certain gestures or pressing a certain control (menu element) on the touch panel in the target UI area created in step 15 or in the entire screen area; b) events triggered by the operating system or other applications that request the application management module 40 to change the display state of a running application or to close it. A display state may refer to the size and shape of the application display area.

In a preferred embodiment as shown in FIG. 3, the particular advantage of the application management module for the user resides in the fact that with a simple gesture or touch of UI control, each application's display size can be instantly changed without the need for re-adjusting size and positioning of the UI's window after every state change. Positioning of the various applications' UI windows is always optimal and as desired by the user and it is guaranteed that all applications can be simultaneously seen and worked with if none of the applications' UIs have been expanded. This important feature also for more efficient observation and exchange of data between two or more applications because, for example, data can be handed over instantly from one application to the other (i.e. copy and paste) without the need to set the data source providing application first to the background and then moving the data receiving application to the foreground as it is required with the commonly used method of the prior art as described in FIG. 2.

The invention provides a method and system to launch and manage an application which is designed for use with a computer platform of the type having a graphical UI and having a touch panel as primary input device replacing traditionally used HIDs such as mouse, mouse stick, trackball or touch pad, which is characterized by the provision of a viewable screen area splitting module 30 for indicating which target UI area(s) of the viewable screen will be used for launch and display of a new application(s), by an application launch module deciding which application(s) to launch and display in the previously selected target UI area(s) and by an application management module defining in which display mode and state of an already running application will be displayed or otherwise closed. The different modules and their subsequent process of use allow the computer platform's user to significantly faster and simpler select one or more applications to launch and display in a dedicated area(s) of the screen, to display and use two or more applications exclusively or in parallel and to simplify exchange of information between two or more applications running in parallel. The invention is therefore more advantageous to use than the prior art. Next to the obvious technical advantages the invention also has significant relevance due to the fact that the present invention provides the necessary process and environment to be able to display in parallel a multitude of small UI applications, or apps, in the area of SmartPhones, or on a bigger screen size such as existing on tablet PCs leading to a complete new richer user experience on such tablet PC devices.

Figure 8:
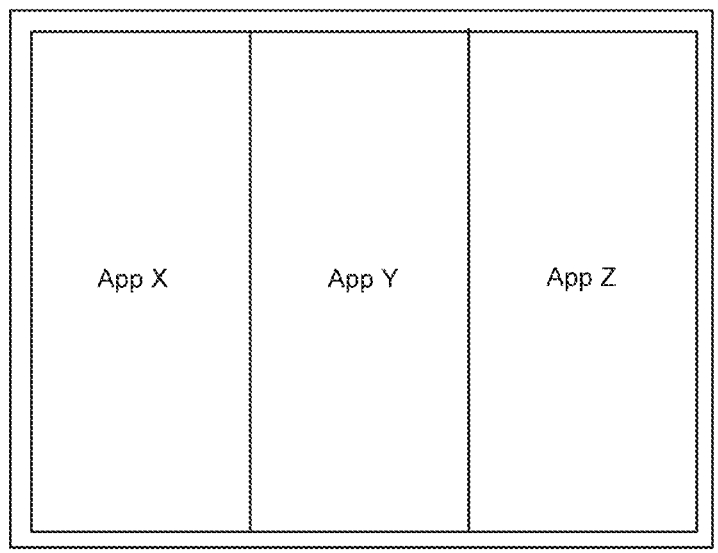
FIG. 8 is a block diagram illustrating a variant displaying three applications simultaneously.

(1) In a variant, referring to FIG. 4, the present invention relates to a computer implemented application management system for devices having a touch screen display. The devices may comprise a processor and a non transitory computer readable medium. The system comprises a splitting module 30 configured to assign an area of the display for use with an application in response to an action of a user of the device, for example, as shown in screen 50. An application launch module 35 is configured for determining a new application to be launched and displayed within the assigned area of the display and then launching the new application, in response to an action of the user of the device, for example, as illustrated in screens 55, 60. An application management module 40 is configured to adjust the display status of a launched application in response to an action of the user, for example, as illustrated in screens 65, 70 and in FIGS. 7 and 8. The launched application operates as any application would according to its configuration and is fully capable of being interacted with by the user within its assigned area.

(2) In another variant of the system, the splitting module 30 comprises a plurality of predefined screen split configurations 75 and the system is configured to display a listing of representative icons corresponding to the predefined screen configurations 75 to the user. The splitting module is configured to assign an area of the display for use with an application in accordance with the configuration represented by the icon 80 selected by the user.

(3) In a further variant of the system, the splitting module 30 comprises a plurality of predefined screen split configurations 75 assigned to one or more gestures on the touch screen. The splitting module 30 is configured to assign 50 an area of the display for use with an application in response to the corresponding gesture carried out by the user.

(4) In yet another variant of the system, the splitting module 30 is configured assign a variable size area of the display for use with an application to be launched based on a gesture carried out by the user. The variable size area lies on a continuum sizes selectable by the user.

Figures 9, 10:
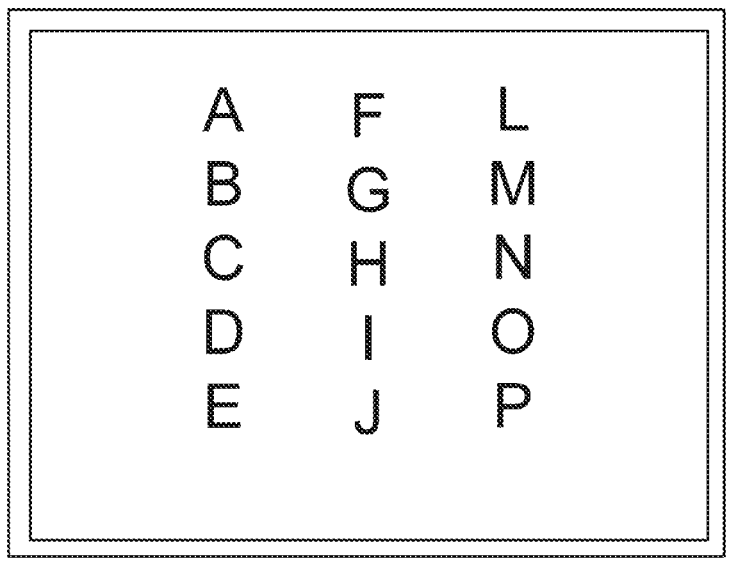
FIG. 9 is a block diagram illustrating a variant with no applications displayed.
FIG. 10 is a block diagram illustrating a smaller area of the screen designated by the screen split module and desktop icons in the new smaller area for the user to select an application to launch.

(5) In still a further variant of the system, referring to FIG. 9-10, if no applications are operating that have been launched by the user (illustrated in FIG. 9), the splitting module is configured to assign a portion of the screen 82 within which an application may be launched (illustrated in FIG. 10).

(6) In a variant of the system, if at least one application is operating and utilizing the entire available screen area 25, the splitting module is configured to reduce the occupied screen space used by the at least one application and generate new unused screen space 50 for use with an application to which may be launched by a user, for example, as illustrated in FIG. 3.

Figure 11:
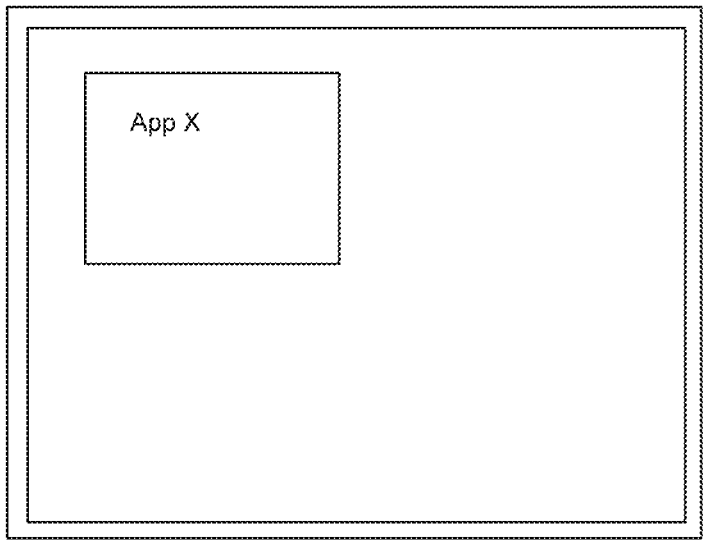
FIG. 11 is a block diagram illustrating an application running and displaying on a portion of the screen less than the complete screen.
Figure 12:
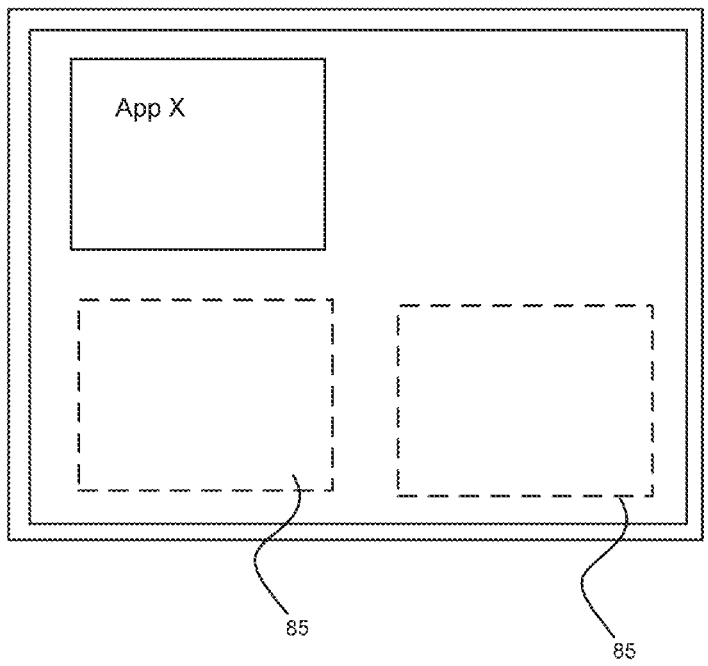
FIG. 12 is a block diagram illustrating the screen splitting module designating a smaller area of the screen prior to the application launch module operating to provide the user with a selection of applications to launch.

(7) In another variant of the system, referring to FIGS. 11 and 12, if at least one application is operating and utilizing a screen area less than the entire screen area (FIG. 11), the splitting module is configured to assign two or more unused areas 85 of the display for displaying respective applications to be launched by the user.

Figure 13:
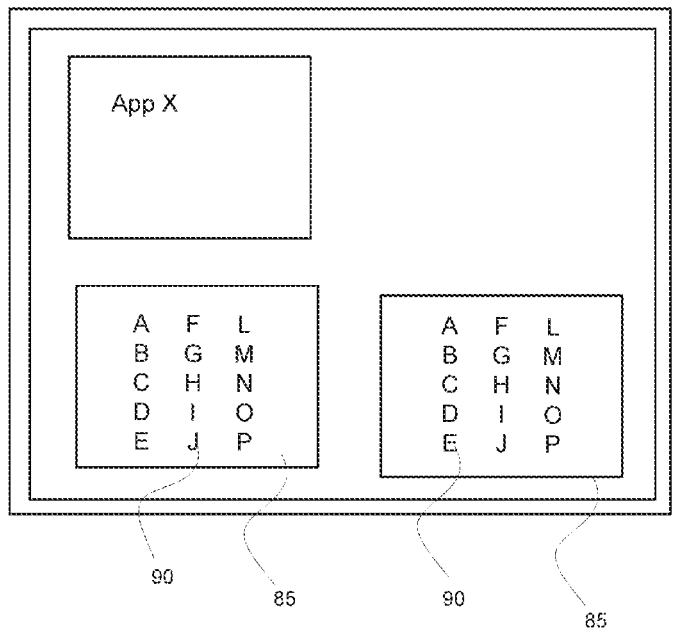
FIG. 13 is a block diagram illustrating the application launch module operating to provide the user with a selection of applications to launch within newly designated smaller areas of the screen.

(8) In a further variant of the system, referring to FIG. 13, if at least one application is operating and utilizing a screen area less than the entire screen area, the splitting module is configured to assign the unused area to display a list 90 of launchable applications by the user.

Figure 14:
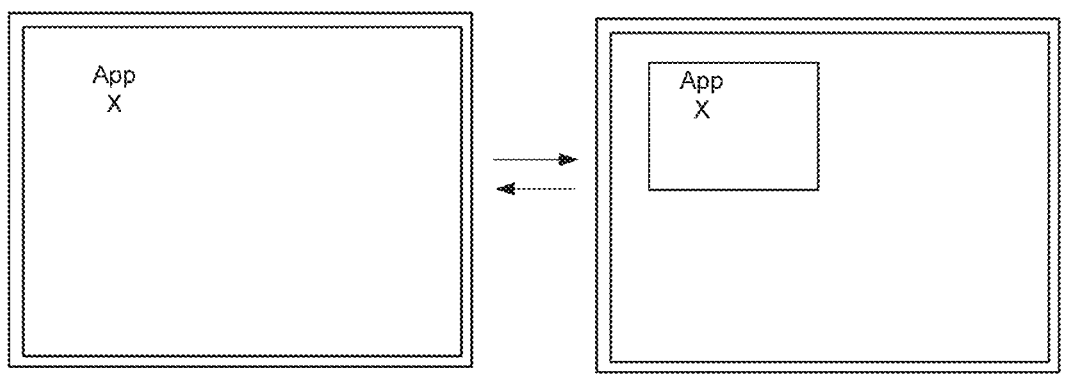
FIG. 14 is a block diagram illustrating a running application toggling between occupying the entire screen to occupying less than the entire screen.

(9) In yet another variant of the system, referring to FIG. 14, if at least one application is operating and is displayed in a screen area previously generated by the splitting module 30 and smaller than the entire physically available screen area, the application management module 40 is configured to toggle between maximizing the displayed area of the application to encompass the entire available screen area and to reduce the size of the maximized displayed area of the application to the previous display size and position of the previously assigned unused screen area.

(10) In still a further variant of the system, prior to a new application being launched, the system is configured to first assign an portion of the display to a yet undetermined application to be launched.

(11) In a variant of the system, prior to the launch of a new application, the system is required to operate the splitting module 30 to assign a new area of the screen, prior to the application launch module.

(12) In another variant of the system, the option to select which subsequent application to launch after a first application has been launched, only appears within newly assigned areas of the screen, assigned by the splitting module 30.

(13) In a further variant of the system, the application management module 40 is configured to close a previously launched application in response to an action of the user.

Figure 15:
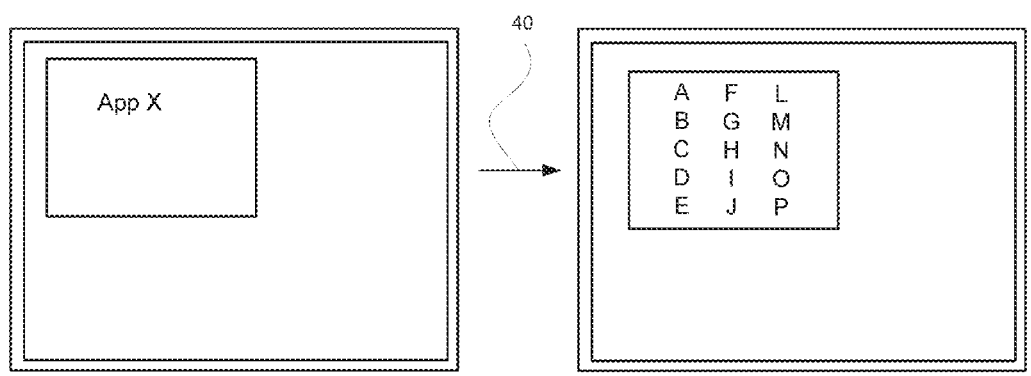
FIG. 15 is a block diagram illustrating a running application occupying less than the entire screen and then being closed and the application module operating to offer the user a new selection of applications to launch within the area formerly occupied by the previously running application.

(14) In still another variant of the system, referring to FIG. 15, if an application displayed within an assigned area has been closed by the application management module 40, the system is configured to display a list of icons representing launchable applications within the assigned area.

(15) In yet a further variant of the system, the system is configured to display two or more applications simultaneously on the touch screen display within respective assigned areas of the screen. When an application displayed within an assigned area has been closed by the application management module, the system is configured to display a list of icons representing launchable applications within the assigned area which had previously displayed the closed application.

Figure 16:
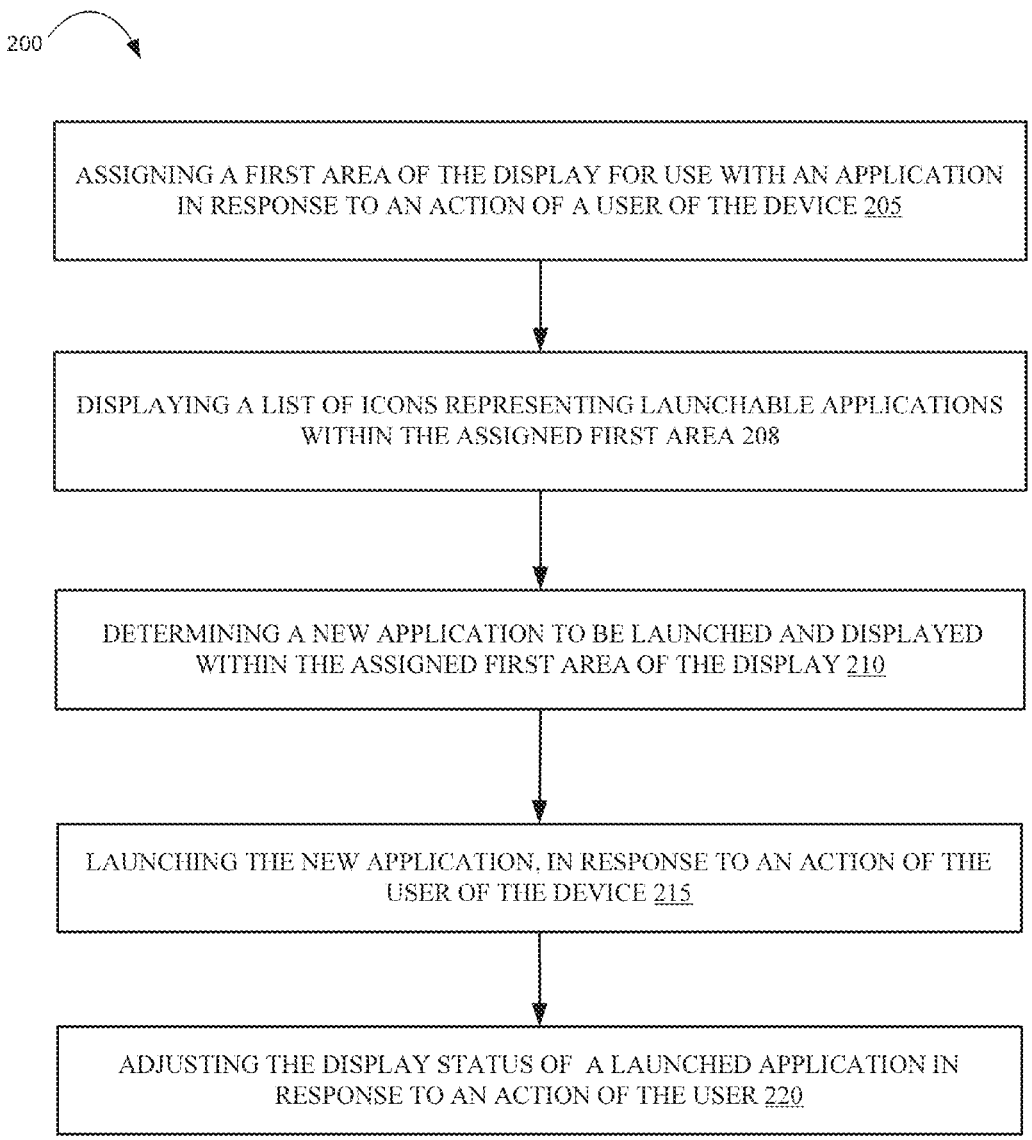
FIG. 16 is a flow chart of a method for managing applications on a touch screen device in accordance with the present invention.

(16) In a variant, referring to FIG. 16, a computer implemented method 200 for application management on devices having a touch screen display, wherein the devices comprise at least a processor and a non transitory computer readable medium, comprises: assigning 205 a first area of the display for use with an application in response to an action of a user of the device; determining 210 a new application to be launched and displayed within the assigned first area of the display and then launching 215 the new application, in response to an action of the user of the device; and adjusting 220 the display status of a launched application in response to an action of the user.

(17) In another variant of the method, the step of assigning a first area of the display for use with an application occurs before determining the application to be launched within the assigned first area.

(18) In a further variant, the method comprises displaying 208 a list of icons representing launchable applications within the assigned first area.

Figure 17:
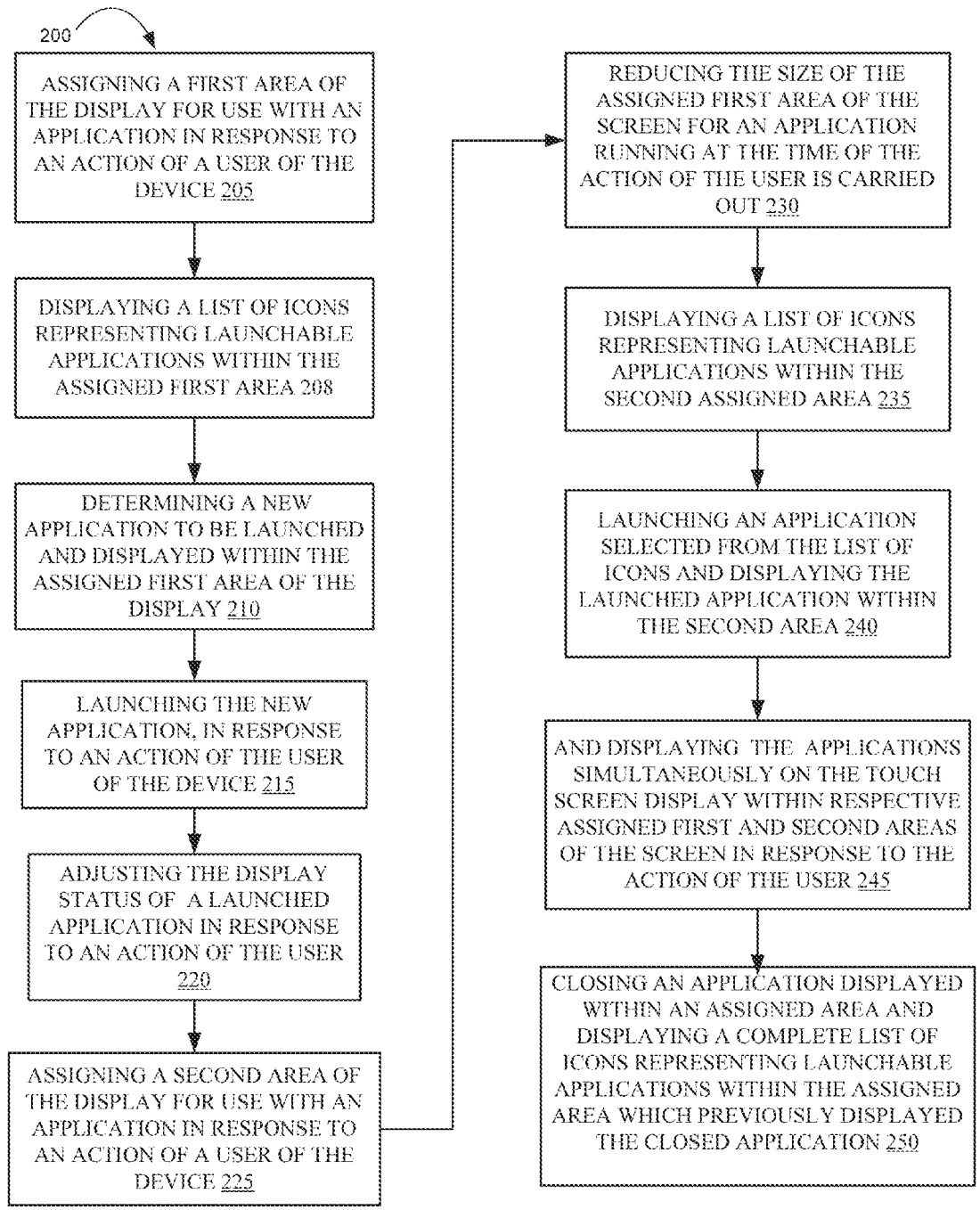
FIG. 17 is a variant of the method for managing applications on a touch screen device in accordance with the present invention.
Figure 18:
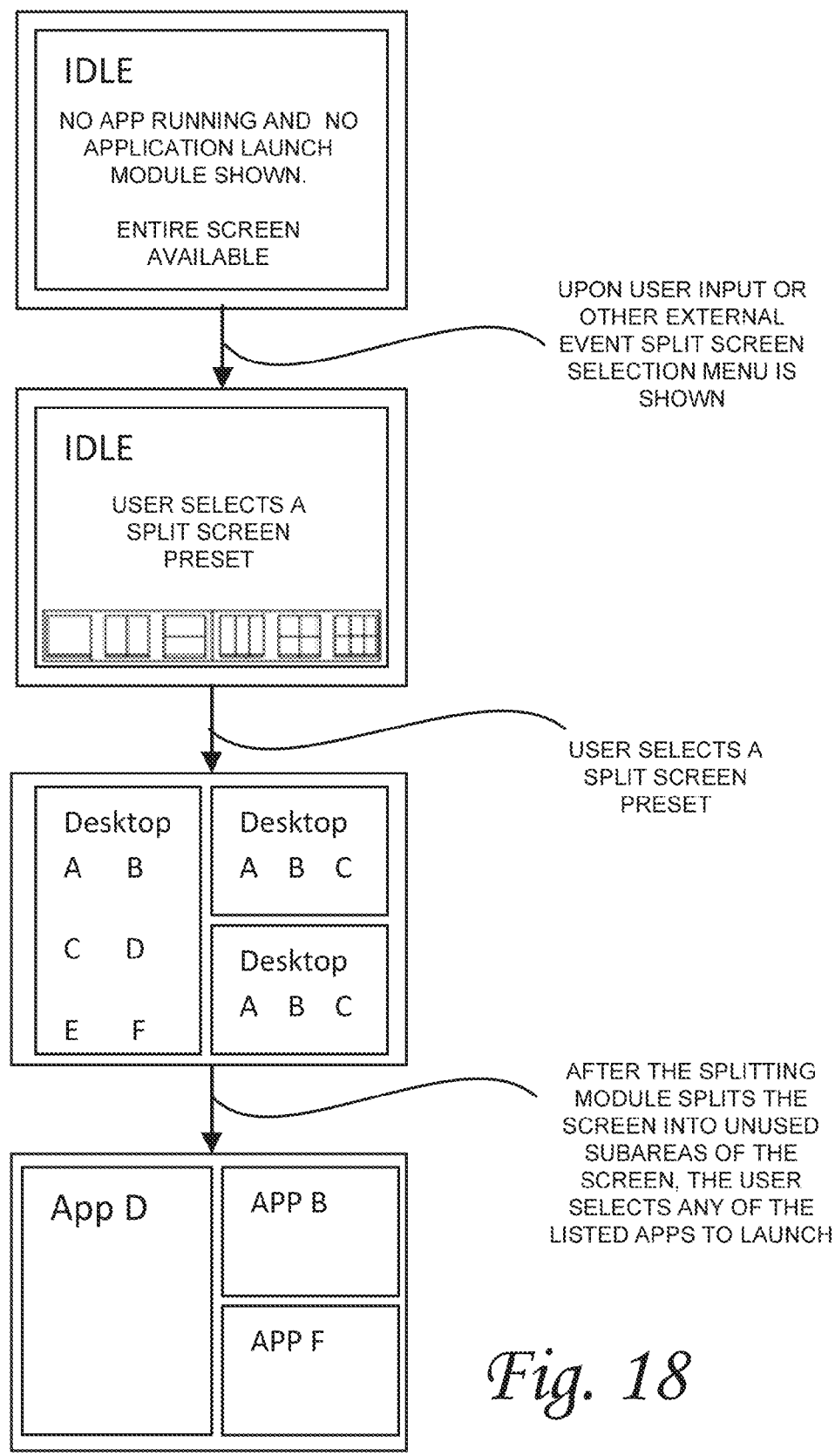
FIG. 18 illustrates a variant in which no app is initially running, the splitting module is configured to assign a portion of the screen (or the entire available screen).
Figure 19:
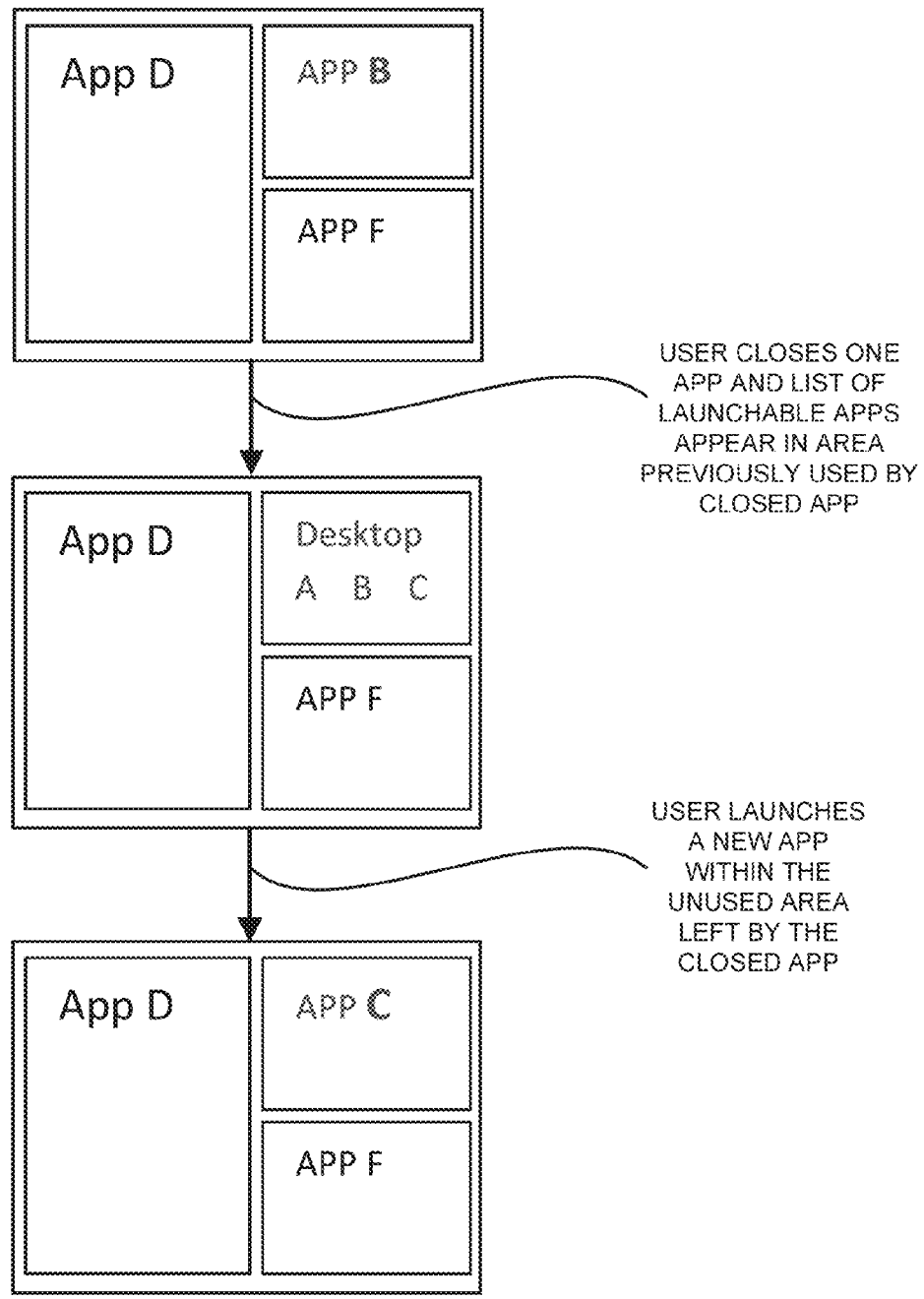
FIG. 19 illustrates a variant in which the screen is split into three areas for 3 different apps. One application is closed in one of the areas which becomes unused, and subsequently, a fourth application is launched in the recently unused area.
Figure 20:
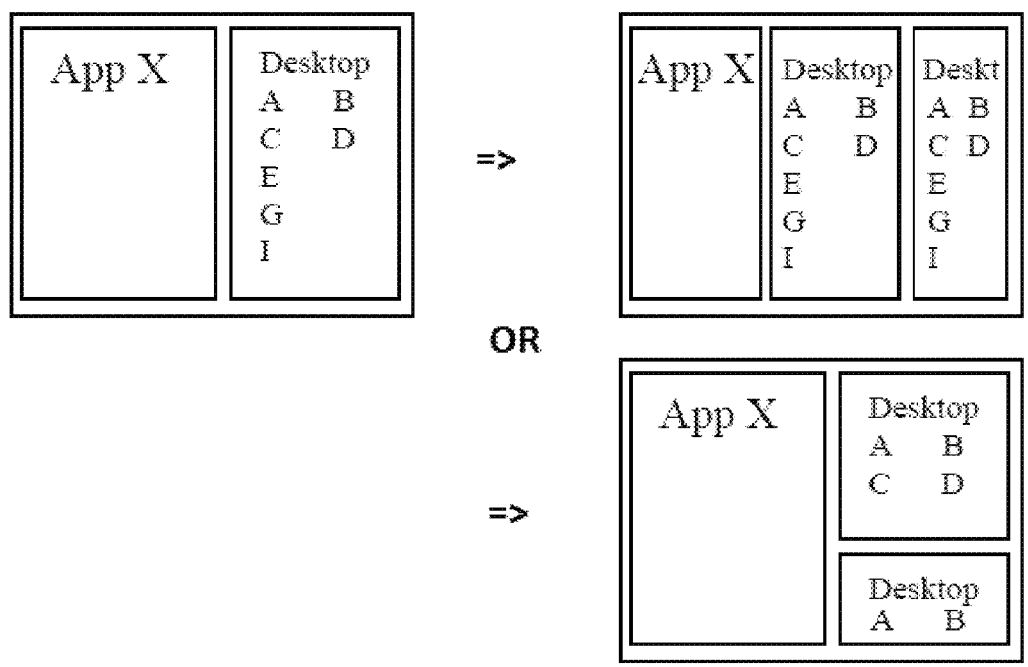
FIG. 20 illustrates splitting currently unused areas further and displaying lists of icons representing launchable applications in each newly split unused area.
Figure 21:
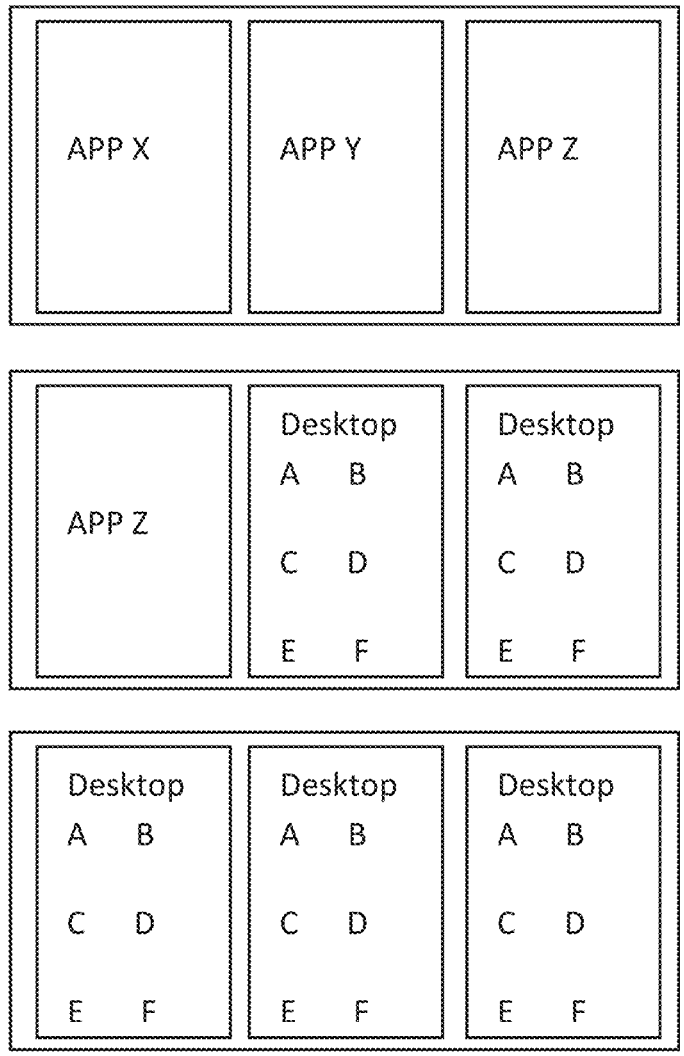
FIG. 21 illustrates that the screen split configuration icons shown in FIG. 7 can launch a) directly a preset of apps in their respective screen areas, or b) directly create the unused areas with desktop icons, or c) a combination of a) and b).

(19) In yet another variant, referring to FIG. 17, the method further comprises: assigning 225 a second area of the display for use with an application in response to an action of a user of the device; reducing 230 the size of the assigned first area of the screen for an application running at the time of the action of the user is carried out; displaying 235 a list of icons representing launchable applications within the second assigned area; launching 240 an application selected from the list of icons and displaying the launched application within the second area; and displaying 245 the applications simultaneously on the touch screen display within respective assigned first and second areas of the screen in response to the action of the user.

(20) In still a further variant, the method comprises: closing 250 an application displayed within an assigned area; and displaying a complete list of icons representing launchable applications within the assigned area which previously displayed the closed application.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer implemented application management system, comprising a processor and a non transitory computer readable medium, for devices having a touch screen display, and having a plurality of applications installed on the devices capable of being selected for launch by a user, the system comprising:
    a splitting module configured to assign an area of the display for use with an application and display the assigned area as an unused area of the screen for displaying a list of launchable applications selectable by the user, in response to an action of a user of the device, and the splitting module comprises a plurality of predefined screen split configurations, and is configured to assign an area of the display for use with an application in accordance with the configuration represented by an icon selected by the user;
    an application launch module configured for determining a new application to be launched and displayed within the assigned area of the display, from any of the plurality of the device's user launchable applications, displayed within the unused split area, and then launching the new application into the unused area split by the splitting module, in response to an action of the user of the device, wherein the launched application operates as any application would according to its configuration and is fully capable of being interacted with by the user within its assigned area; and
    an application management module configured to adjust the display status of a launched application in response to an action of the user;
    wherein the system is configured to display a listing of representative icons corresponding to the predefined screen configurations.

2. The system of claim 1, wherein if at least one application is operating and utilizing the entire available screen area, the splitting module is configured to reduce the occupied screen space used by the at least one application and generate new unused screen space for use with an application to which may be launched by a user.

3. The system of claim 1, wherein if at least one application is operating and utilizing a screen area less than the entire screen area, the splitting module is configured to assign two or more unused areas of the display for displaying respective applications to be launched by the user.

4. The system of claim 1, wherein if at least one application is operating and utilizing a screen area less than the entire screen area, the splitting module is configured to assign the unused area to display a list of launchable applications by the user.

5. The system of claim 1, wherein if at least one application is operating and is displayed in a screen area previously generated by the splitting module and smaller than the entire physically available screen area, the application management module is configured to toggle between maximizing the displayed area of the application to encompass the entire available screen area and to reduce the size of the maximized displayed area of the application to the previous display size and position of the previously assigned unused screen area.

6. The system of claim 1, wherein prior to a new application being launched, the system is configured to first assign an portion of the display to a yet undetermined application to be launched.

7. The system of claim 1, wherein prior to the launch of a new application, the system is required to operate the splitting module prior to the application launch module.

8. The system of claim 1, wherein the option to select which subsequent application to launch after a first application has been launched, only appears within newly assigned areas of the screen, assigned by the splitting module.

9. The system of claim 1, wherein the application management module is configured to close a previously launched application in response to an action of the user.

10. The system of claim 1, wherein if an application displayed within an assigned area has been closed by the application management module, the system is configured to display a list of icons representing launchable applications within the assigned area.

11. The system of claim 1, wherein the system is configured to display two or more applications simultaneously on the touch screen display within respective assigned areas of the screen; and wherein when an application displayed within an assigned area has been closed by the application management module, the system is configured to display a list of icons representing launchable applications within the assigned area which previously displayed the closed application.

12. A computer implemented method for application management on devices having a touch screen display, and having a plurality of applications installed on the devices capable of being selected for launch by a user, wherein the devices comprise a processor and a non transitory computer readable medium, the method comprising:

displaying a list of predefined screen split configurations represented by graphical elements, assigning a first unused area of the display for use with an application in response to an action of a user of the device, in accordance with the configuration represented by a screen split configuration selected by the user;

displaying within the assigned first unused area of the screen, a list of launchable applications selectable by the user;

determining a new application to be launched and displayed within the assigned first unused area of the display and then launching the new application selected by a user from the list of launchable applications displayed within the assigned first unused area of the screen, in response to an action of the user of the device; and adjusting the display status of a launched application in response to an action of the user.

13. The method of claim 12, wherein the step of assigning a first area of the display for use with an application, occurs before determining the application to be launched within the assigned first area.

14. The method of claim 13, further comprising displaying a list of icons representing launchable applications within the assigned first area.

15. The method of claim 14, further comprising:

assigning a second area of the display for use with an application in response to an action of a user of the device;

reducing the size of the assigned first area of the screen for an application running at the time of the action of the user is carried out;

displaying a list of icons representing launchable applications within the second assigned area;

launching an application selected from the list of icons and displaying the launched application within the second area; and displaying the applications simultaneously on the touch screen display within respective assigned first and second areas of the screen in response to the action of the user.

16. The method of claim 15, further comprising:

closing an application displayed within an assigned area; and displaying a list of icons representing launchable applications within the assigned area which previously displayed the closed application.

\* \* \* \* \*